(12) United States Patent
Dow

(10) Patent No.: US 12,286,029 B2
(45) Date of Patent: Apr. 29, 2025

(54) COMMUNICATION METHOD BETWEEN ELECTRIC VEHICLE, SUPPLY EQUIPMENT, AND POWER GRID OPERATION SERVER

(71) Applicant: Hyundai Mobis Co., Ltd., Seoul (KR)

(72) Inventor: Young Soo Dow, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 799 days.

(21) Appl. No.: 17/556,169

(22) Filed: Dec. 20, 2021

(65) Prior Publication Data

US 2022/0203861 A1 Jun. 30, 2022

(30) Foreign Application Priority Data

Dec. 24, 2020 (KR) ........................ 10-2020-0183874

(51) Int. Cl.
*B60L 55/00* (2019.01)
*B60L 53/30* (2019.01)
*B60L 53/68* (2019.01)
*B60W 10/26* (2006.01)

(52) U.S. Cl.
CPC ............. *B60L 55/00* (2019.02); *B60L 53/305* (2019.02); *B60L 53/68* (2019.02); *B60W 10/26* (2013.01)

(58) Field of Classification Search
CPC . Y04S 10/126; Y04S 20/222; Y02B 70/3225; Y02B 70/30; B60L 53/63; B60L 53/64; B60L 53/665; B60L 53/68; B60L 53/305; B60L 55/00; B60W 10/26
See application file for complete search history.

(56) References Cited

U.S. PATENT DOCUMENTS

2017/0259683 A1 9/2017 Shimizu et al.
2018/0218459 A1* 8/2018 Yokoyama ............... H04L 67/12

FOREIGN PATENT DOCUMENTS

EP 2 770 608 A2 8/2014
KR 102182321 B1 * 11/2020

* cited by examiner

*Primary Examiner* — David V Henze-Gongola
(74) *Attorney, Agent, or Firm* — NSIP Law

(57) ABSTRACT

A method of communicating between an electric vehicle, a supply equipment, and a power grid includes transmitting, by an electric vehicle communication controller of the electric vehicle, a discharge schedule including an amount of energy discharge, a discharge start time, and a discharge finish time to a supply equipment communication controller of the supply equipment or a power grid communication controller of the power grid operation server, and receiving a discharge cost calculated according to the discharge schedule from the supply equipment communication controller or the power grid communication controller, wherein the discharge cost including an additional calculation cost, in response to a sum of the amount of energy discharge of the electric vehicle and an amount of energy discharge of another electric vehicle being greater than or equal to a reference energy discharge amount.

12 Claims, 7 Drawing Sheets

COMMUNICATION METHOD BETWEEN ELECTRIC VEHICLE, SUPPLY EQUIPMENT, AND POWER GRID OPERATION SERVER

CROSS-REFERENCE TO RELATED APPLICATIONS

This application claims the benefit under 35 U.S.C. § 119 to Korean Patent Application No. 10-2020-0183874, filed on Dec. 24, 2020, in the Korean Intellectual Property Office, the entire disclosure of which is incorporated herein by reference for all purposes.

TECHNICAL FIELD

1. Field

The present invention relates to a vehicle-to-grid (V2G) communication interface.

BACKGROUND

2. Description of Related Art

V2G is an abbreviation of "vehicle to grid," which is a term that means that an electric vehicle and a power grid are connected. Standards related to V2G technology do not define specific communication interfaces related to a discharge schedule for an effective billing policy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of communicating between an electric vehicle, a supply equipment, and a power grid operation server that monitors a power grid, the method including transmitting, by an electric vehicle communication controller of the electric vehicle, a discharge schedule including an amount of energy discharge, a discharge start time, and a discharge finish time to a supply equipment communication controller of the supply equipment or a power grid communication controller of the power grid operation server, and receiving a discharge cost calculated according to the discharge schedule from the supply equipment communication controller or the power grid communication controller, wherein the discharge cost including an additional calculation cost, in response to a sum of the amount of energy discharge of the electric vehicle and an amount of energy discharge of another electric vehicle being greater than or equal to a reference energy discharge amount.

The method may include setting up the discharge schedule in the electric vehicle prior to the transmitting of the discharge schedule, wherein the setting up of the discharge schedule including setting a discharge start time and a discharge finish time on the basis of battery capacity information, battery voltage information, and state-of-charge information.

The transmitting of the discharge schedule may include transmitting a message for calculation of the discharge cost, to the supply equipment communication controller of the supply equipment or the power grid communication controller of the power grid operation server on the basis of the sum of the amount of energy discharge of the electric vehicle and the amount of energy discharge of the another electric vehicle.

The additional calculation cost may be varied based on the sum of the amount of energy discharge of the electric vehicle and the amount of energy discharge of the another electric vehicle.

The method may include transmitting an authorization message for the discharge cost to the supply equipment communication controller or the power grid communication controller using the electric vehicle communication controller, and transmitting a message, indicating that a discharge process is forcibly stopped, in response to the discharge process being stopped prior to the discharge finish time by an user of the vehicle, to the supply equipment communication controller or the power grid communication controller using the electric vehicle communication controller.

The method may include receiving, from the supply equipment communication controller or the power grid communication controller, a message indicating a return cost of a difference between a discharge cost calculated based on the discharge finish time and a discharge cost calculated when the discharge is forcibly stopped, in response to the discharge process being forcibly stopped.

In another general aspect, there is provided a method of communicating between an electric vehicle, a supply equipment, and a power grid operation server that monitors a power grid, the method including transmitting, by a supply equipment communication controller embedded in the supply equipment, a discharge cost based on a discharge schedule of the electric vehicle to an electric vehicle communication controller embedded in the electric vehicle, transmitting a message related to an authorization request for the discharge cost to the electric vehicle communication controller using the supply equipment communication controller, and receiving, at the supply equipment communication controller, an authorization message for the discharge cost from the electric vehicle communication controller, wherein the discharge cost including an additional calculation cost, in response to a sum of the amount of energy discharge of the electric vehicle and an amount of energy discharge of another electric vehicle being greater than or equal to a reference energy discharge amount.

The method may include setting up the discharge schedule in the supply equipment prior to the transmitting of the discharge cost based on the discharge schedule, wherein the setting up of the discharge schedule may be based on battery capacity information, battery voltage information, and state-of-charge information received from the electric vehicle communication controller and a sales tariff table received from a power grid communication controller of the power grid operation server.

The method may include setting up the discharge schedule in the supply equipment prior to the transmitting of the discharge cost, wherein the discharge schedule including the amount of energy discharge, a discharge start time, and a discharge finish time.

The method may include, after the receiving of the authorization message for the discharge cost, transmitting, to the supply equipment communication controller and a power grid communication controller of the power grid operation server, a message indicating that the discharge process is forcibly stopped by an operator of the supply equipment.

The method may include transmitting, from the electric vehicle communication controller or the power grid communication controller, a message indicating a return cost of a difference between a discharge cost calculated based on the discharge finish time and a cost calculated based on a finish time when the discharge is forcibly stopped, in response to the discharge process being forcibly stopped.

The method may include calculating an amount of carbon dioxide reduction on the basis of the amount of energy consumption of an off-board charger of the supply equipment using the supply equipment communication controller, and transmitting information related to the amount of carbon dioxide reduction to the electric vehicle communication controller and the power grid communication controller.

Other features and aspects will be apparent from the following detailed description, the drawings, and the claims.

Figure 1:
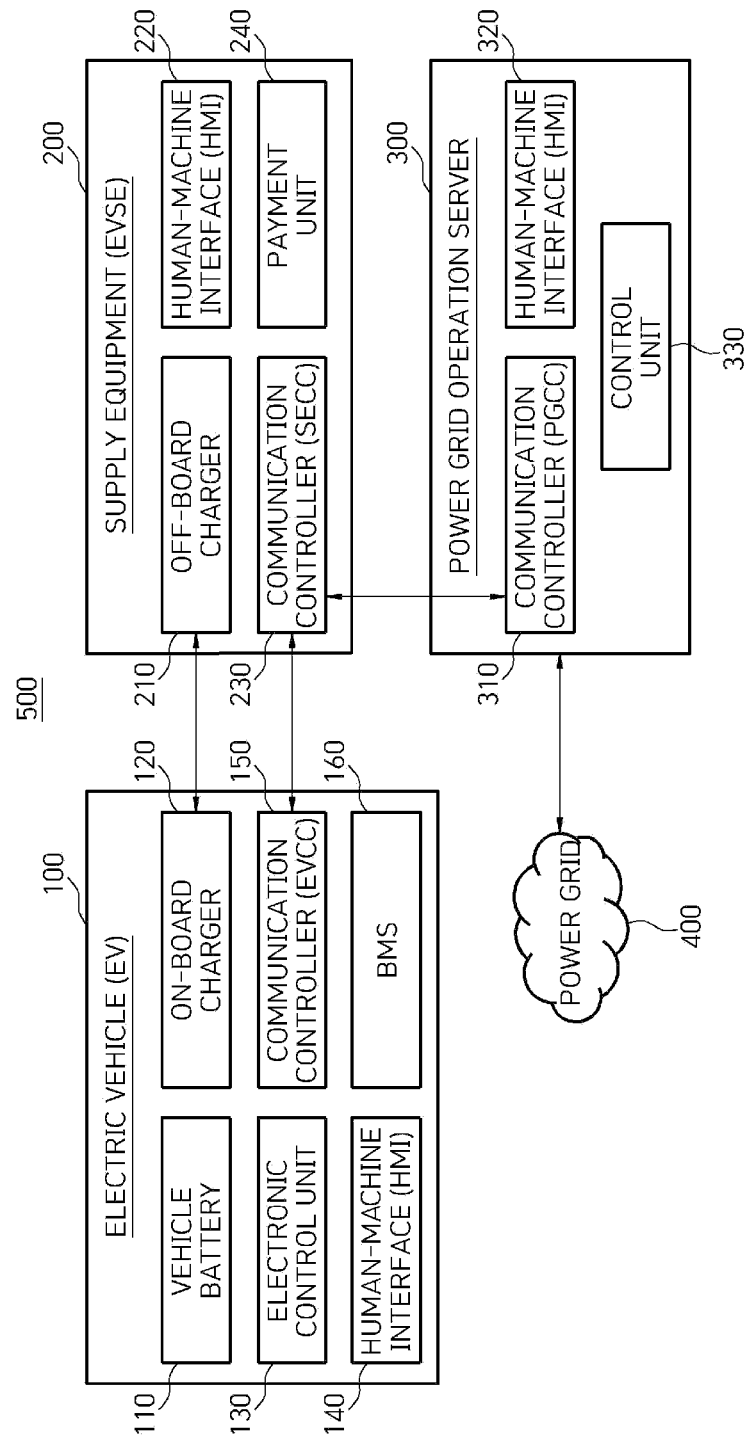
FIG. 1 is an overall configuration diagram of a vehicle-to-grid (V2G) system according to an embodiment of the present invention.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The present invention is applicable to communication between an electric vehicle (EV2) and an electric vehicle supply equipment (EVSE).

In addition, the present invention is also applicable to electric vehicles used for carriage of passengers, electric vehicles used for carriage of goods, and electric vehicles of other categories.

Also, the present invention is applicable to high-level communication (HLC) related to conductive and wireless power transfer technologies.

Also, the present invention is applicable to technical fields in which energy is transferred from an EVSE to an EV to charge a battery of the EV and in which energy is transferred from an EV to an EVSE so that the energy can be supplied to homes, loads, or grids.

Also, the present invention is applicable to technical fields related to charge or discharge control, payment, load leveling, and privacy.

Definition of Terms

Electric Vehicle Communication Controller (EVCC)

An EVCC is an in-vehicle system that implements communication between an EV and a supply equipment communication controller (SECC) in order to support specific functions.

These specific functions include input and output channel control, encryption, data transfer between a vehicle and an SECC, and the like.

Supply Equipment Communication Controller (SECC)

An SECC is an entity capable of communicating with one or multiple EVCCs and interacting with a secondary actor.

Electric Vehicle Supply Equipment ID (EVSE ID)

An EVSE ID is a unique ID of a charging place.

Secondary Actor

A secondary actor is an entity that is indirectly involved in an energy transfer process including a charge process and a discharge schedule.

The secondary actor may include, for example, an electric vehicle service operator information management office (E-Mobility Operator Clearing House), a demand information management office (Demand Clearing House), an electric vehicle operator (Fleet Operator), an electric vehicle service operator (E-Mobility Operator), a distribution system operation (Distribution System Operator), an electricity meter operator, an electric provider, and the like.

Examples of the secondary actor are defined in detail in ISO 15118-1.

Payment Unit

A payment unit is an internal device of a supply equipment that provides a payment method. Here, the payment method may be external identification means (EIM), cash, credit card, etc. Here, the EIM refers to an external means that allows a vehicle user to identify his or her contract or EV and may include, for example, near field communication (NFC), radio-frequency identification (RFID), short message service (SMS), and so on.

When an EVCC normally selects a payment method, the payment unit informs an SECC of whether a customer is authorized.

Amount of Energy Charge

The amount of energy charge may be energy required for an EV until departure time is reached. The amount of energy charge may be, for example, energy at which the state of charge (SOC) of a vehicle battery is equal to 100% or close to 100% (e.g., 80%). Here, the departure time may be the time when a vehicle user unplugs a vehicle's charging plug or the time when a vehicle user leaves a charging station.

Amount of Energy Discharge

The amount of energy discharge may be defined as energy transferred from an EV to an EVSE or to a power grid via an EVSE according to a target value or a discharge schedule set up by a user.

Vehicle User

A vehicle user may be defined as an individual or legal entity that uses a vehicle and provides information necessary for driving and thus influences a charging pattern and/or a discharging pattern.

Authentication

Authentication is a procedure performed between an EVCC and an SECC or between a vehicle user and an EVSE or a secondary actor in order to prove whether provided information (ID, etc.) is correct and valid or whether provided information belongs to an EVCC, a vehicle user, and an SECC.

Service Provider

A service provider may be defined as a secondary actor that provides value-added services to customers through an operator of an EVSE.

Authorization

Authorization may be defined as a procedure in which an EVSE checks whether an EV is authorized to be charged or discharged or vice versa.

Charger

A charger may be defined as a power conversion device that performs essential functions for charging and discharging batteries.

Charge Schedule

A charge schedule may be defined as a plan including charging limits of an EV for a specific period of time. A charge schedule may be an energy transfer schedule related to energy transferred from a power grid to an EV.

Charging Limits

Charging limits may be defined as physical constraints (e.g., voltage, current, energy, and power) negotiated for a charging session during a V2G communication session.

Charging Session

A charging session may be defined as a period of time between the start (cable connection) and the end (cable disconnection) of a charge process.

Discharge Schedule

A discharge schedule may be defined as a plan including discharging limits of an EV for a specific period of time. A discharge schedule may be an energy transfer schedule related to energy transferred from an EV to a power grid.

Battery Management System (BMS)

A BMS may be defined as an electronic apparatus that controls or manages electrical and thermal functions of a vehicle battery and provides communication between the vehicle battery and another vehicle controller.

Discharging Limits

Discharging limits may be defined as physical constraints (e.g., voltage, current, energy, and power) negotiated for a discharging session during a V2G communication session.

Discharging Session

A discharging session may be defined as a period of time between the start (cable connection) and the end (cable disconnection) of a discharge schedule.

Grid Schedule

A grid schedule may be defined as a function of setting a power level at a specific time based on a local grid situation. Parameters for calculating the grid schedule may include, for example, an actual or predicted demand and supply situation of a local grid.

Identification

Identification may be defined as a procedure in which an EVCC or a user provides identification information (identification code) for authentication or a procedure in which an SECC provides an EVSE ID to an EVCC.

Sales Tariff Table

A sales tariff table is used to provide an input value for calculating a charge schedule and/or a discharge schedule. A sales tariff table may be issued by a secondary actor, such as an electric provider and an electric vehicle service operator. A sales tariff table reflects the "balance of supply and demand of an electric provider" and the "use of green energy." A sales tariff table may be regularly updated.

Electric Provider

An electric provider is a secondary actor that supplies electricity.

Hereinafter, embodiments of the present invention will be described in detail with reference to the drawings.

FIG. 1 is an overall configuration diagram of a vehicle-to-grid (V2G) system according to an embodiment of the present invention.

Referring to FIG. 1, a V2G system 500 according to an embodiment of the present invention provides a communication interface related to a discharge schedule for an effective billing policy.

To this end, the V2G system 500 includes an electric vehicle (EV) 100, an electric vehicle supply equipment (EVSE) 200, and a power grid operation server 300.

Electric Vehicle (EV) 100

The EV 100 may be a battery-electric vehicle (BEV) or a plug-in hybrid electric vehicle (PHEV).

The EV 100 includes a vehicle battery 110, an on-board charger (OBC) 120, an electronic control unit 130, a human-machine interface (HMI) 140, an electric vehicle communication controller (EVCC) 150, and a battery management system (BMS) 160.

The vehicle battery 110 is a high-voltage battery installed in the EV 100 and may be referred to as a rechargeable energy storage system (RESS).

The OBC 120 may be configured to include a power conversion device installed in the EV 100. The power conversion device may be a two-way charger that performs an essential function for charging and discharging the vehicle battery 110.

The OBC 120 may exchange commands and/or information related to the charging or discharge schedule with the EVCC 150.

The OBC 120 may be configured to further include a control chip having a data processing function (including a processor, a memory, etc.) so as to exchange the information and/or commands with the EVCC 150.

Moreover, FIG. 1 shows that the EVCC 150 and the OBC 120 are separated from each other, but the EVCC 150 may be consolidated into the OBC 120. In this case, the OBC 120 may be configured to include the power conversion device, the control chip, and the EVCC 150.

The electronic control unit 130 may be a unit that provides information related to the EV 100. The information related to the EV 100 may be vehicle driving-related information.

The HMI 140 may have an interfacing function for displaying information related to the charging or discharge schedule and inputting information and/or commands related to the charging or discharge schedule.

The input of all the information and/or commands and the display of all the information and/or commands may be performed through the HMI 140.

The HMI 140 may be configured to include a "charge button" and a "discharge button" for a vehicle user to start the charging or discharge schedule.

The HMI 140 may be a display device having an input function for a vehicle user to input the information related to the charging or discharge schedule.

For example, the display device may be a central information display (CID) that has a cluster informing about the velocity, mileage, battery status, and normal operation of the EV 100 and audio, video, and navigation (AVN) functions embedded therein to display and control the operation states of various devices in the EV 100.

The EVCC 150 may be an in-vehicle system that implements communication between the EV 100 and a supply equipment communication controller (SECC) 230 so as to support specific functions.

The communication between the EVCC 150 and the SECC 230 may be, for example, power line communication (PLC) communication. It is assumed that the term "electric vehicle" used herein refers to an electric vehicle with a PLC function.

The PLC may be referred to as power-line carrier, mains communication, power-line telecom (PLT), or power-line networking (PLN).

The PLC may be used as a term to describe several different systems for carrying information over power lines.

The EVCC 150 may be configured to include a memory, a processor, and a communicator.

The memory includes a volatile and/or non-volatile storage medium for storing messages related to the charging or discharge schedule based on a protocol agreed with the SECC 230.

The processor processes messages received from the SECC 230 or processes messages to be transmitted to the SECC 230.

The communicator may be a hardware element configured to transmit a message related to the charging or discharge schedule to the SECC 230 or receive a message related to the charging or discharge schedule from the SECC 230 on the basis of an agreed communication method, e.g., PLC. The communicator may include multiple hardware components for providing modulation, demodulation, filtering, and amplification functions.

The EVSE 200 may be a device configured to deliver energy (e.g., power, voltage, current, or the like) from the premises wiring to the EV 100 and receive energy (e.g., power, voltage, current, or the like) from the EV 100.

The EVSE 200 may be configured to include a phase(s), neutrals, protective earth conductors, EV couplers, attached plugs, accessories, power outlets, electrical outlets or appliances, and the like.

The EVSE 200 may be configured to include an off-board charger 210, an HMI 220, an SECC 230, and a payment unit 240.

The off-board charger 210 may be configured to include a power conversion device installed in the EVSE 200. The power conversion device in the off-board charger 210 may be a two-way charger that transfers energy to the OBC 120 installed in the EV 100 or receives energy from the OBC 120.

Figure 6:
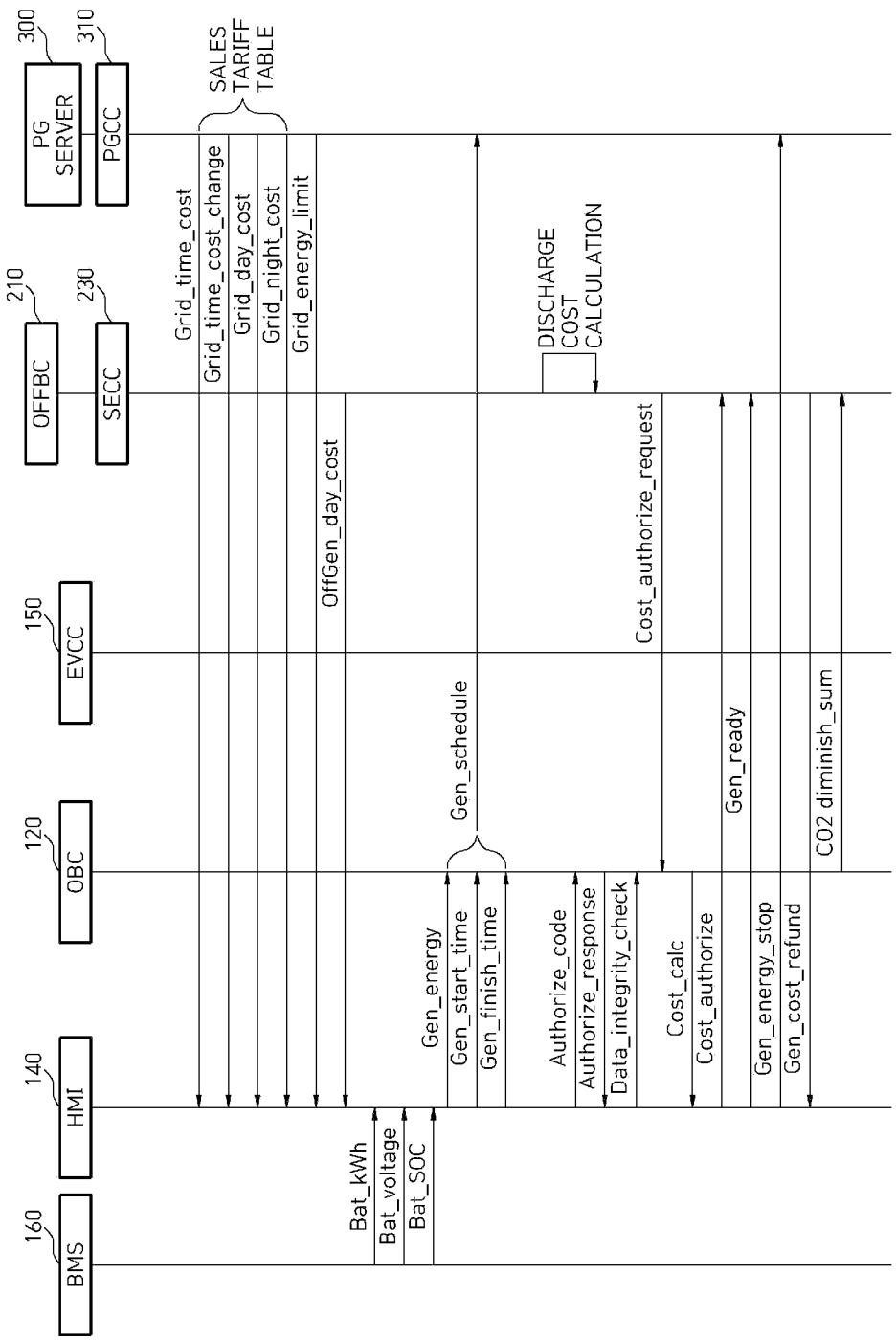
FIG. 6 is a sequence diagram of messages exchanged between an electric vehicle, a supply equipment, and a power grid operation server on the basis of a discharge scenario according to an embodiment of the present invention and also is a sequence diagram in the case of setting up a discharge schedule in the electric vehicle.
Figure 7:
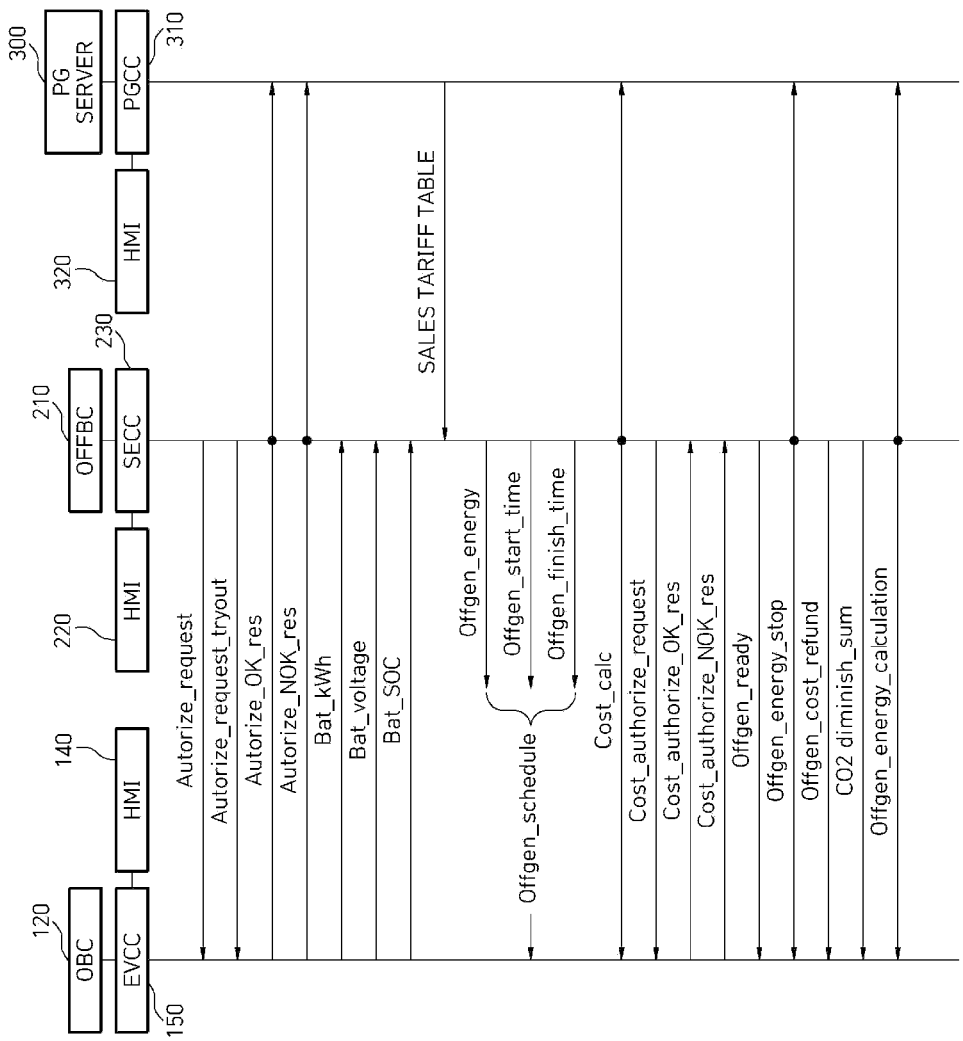
FIG. 7 is a sequence diagram between an electric vehicle, a supply equipment, and a power grid operation server according to another embodiment of the present invention and also is a sequence diagram in the case of setting up a discharge schedule in the supply equipment.

From the standpoint of the off-board charger 210, transferring energy to the OBC 120 indicates charging, and receiving energy from the OBC 120 indicates discharging. From the standpoint of the EV, discharging is transferring energy to an off-board charger and thus indicates electricity generation. Gen included in a message symbol shown in FIGS. 6 and 7 is an abbreviation of "generation."

The off-board charger 210 exchanges commands and/or information related to the charging or discharge schedule with the SECC 230. To this end, the off-board charger 210 may be configured to further include a control chip that processes commands and/or information transmitted to the SECC 230 or received from SECC 230. The control chip may be configured to basically include a processor and a memory mounted on one board.

FIG. 1 shows that the off-board charger 210 and the SECC 230 are separated from each other, but the SECC 230 may be built in the off-board charger 210. In this case, the off-board charger 210 may be configured to include the power conversion device, the control chip, and the SECC 230.

The HMI 220 has an interfacing function for displaying the commands and/or information related to the charging or discharge schedule and inputting the commands and/or information to the off-board charger 210 or the SECC 230 of the EVSE 200.

The input of all the information and/or commands and the display of all the information and/or commands may be performed through the HMI 220.

The HMI 220 may be configured to include a "charge button" and a "discharge button" for a vehicle user to input commands and/or information related to a charge or discharge schedule and a charging or discharge schedule.

The HMI 220 may be a display device having an input function for a vehicle user to input commands and/or information related to the charge or discharge schedule and a charging or discharge schedule.

The SECC 230 is an entity capable of communicating with one or multiple EVCCs and interacting with a secondary actor.

Examples of the secondary actor have been described in the "Definition of Terms" section. In FIG. 1, the power grid operation server 300 may be included in the secondary actor.

FIG. 1 shows one-to-one communication between one SECC 230 and one EVCC 150. The present invention is not limited thereto, and when one SECC 230 communicates with multiple EVCCs, the SECC 230 manages the multiple EVCCs and recognizes the clusters of the outlets to which the EVCCs are connected.

The SECC 230 may be configured to include a memory, a processor, and a communicator.

The memory may be a volatile or non-volatile storage medium for storing messages related to the charging or discharge schedule on the basis of a communication protocol (communication standard) agreed with the EVCC 150.

The processor processes messages received from the EVCC 150 or processes messages to be transmitted to the EVCC 150.

The communicator may be a hardware element configured to transmit a message related to the charging or discharge schedule to the EVCC 150 or receive a message related to the charging or discharge schedule from the EVCC 150 on the basis of an agreed communication method, e.g., PLC. The communicator may include multiple hardware components for providing modulation, demodulation, filtering, and amplification functions.

The SECC 230 may communicate with the power grid operation server 300. In this case, a gateway, a router, and the like may be interposed between the SECC 230 and the power grid operation server 300.

The SECC 230 may transmit or receive any information and/or command related to the charging or discharge schedule to or from the power grid operation server 300.

The power grid operation server 300 mediates between the SECC 230 and the power grid 400. The power grid 400 may be configured to include local transformers, distribution grids, power substations, transmission grids, transmission substations, and power plants (including renewable energy).

The power grid operation server 300 may be an entity for grid negotiation that provides information on the load of the grid.

The power grid operation server 300 collects and monitors any necessary information for any parts of the power grid 400, for example, current and expected loads of local transformers, distribution grids, power substations, transmission grids, transmission substations, and power plants.

The collected current load or expected load is utilized for the EV 100 or the EVSE 200 to set up a charge or discharge schedule.

The power grid operation server 300 may provide information required by the EVCC 150 or the SECC 230 to set up the charge or discharge schedule to the EVCC 150 or the SECC 230.

The collection and provision of the information performed by the power grid operation server 300 may be performed by a power grid communication controller (PGCC) 310.

The PGCC 310 is configured to include a memory configured to store information collected from the power grid 400 and information collected from the EV 100 and/or the EVSE 200, a processor having a data processing function to process the collected information, and a communicator configured to transmit the processed information to the SECC 230.

An HMI 320 of the power grid operation server 300 displays information collected by the power grid operation server 300 and delivers information input by an operator of the power grid operation server 300 to the PGCC 310.

The HMI 320 may be a display device, and the display device has an input function. The display device displays and provides any collected information to the operator of the power grid operation server 300.

A control unit 330 of the power grid operation server 300 manages and controls the operations of the PGCC 310 and the HMI 320.

The control unit 330 includes at least one processor having a data processing function and a computational function. The control unit 330 creates and processes a message based on a communication protocol agreed between the PGCC 310 and the SECC 230.

The power grid operation server 300 may consolidate grid information collected from the power grid 400 into grid profile and may provide the grid profile to the SECC 230 and/or the EVCC 150.

The EV 100 and the EVSE 200 may set the charge or discharge schedule on the basis of the grid profile provided from the power grid operation server 300.

Also, the power grid operation server 300 may provide a proposal for the charge or discharge schedule to the SECC 230 on the basis of the grid profile.

When the grid profile is changed, the power grid operation server 300 may inform the SECC 230 of necessity for an updated charge or discharge schedule (or an updated energy transfer schedule).

When the power grid operation server 300 is referred to as a distribution system, the power grid operation server 300 may be a server responsible for voltage stability in the distribution grid.

The power grid 400 may be used as a term including a distribution system network, and the distribution system network carries electricity from a transmission grid to consumers.

The distribution system network includes medium-voltage power lines, electrical substations, low-voltage distribution wiring networks, associated equipment, and the like.

A communication protocol defining communication between the EVCC 150 and the SECC 230 may be the same as or different from a communication protocol defining communication between the SECC 230 and the PGCC 310.

When the communication protocols are different, the SECC 230 may convert and process commands and/or information related to the charge or discharge schedule received from the EVCC 150 using a communication protocol agreed with the PGCC 310.

Conversely, when the communication protocols are different, the SECC 230 may convert and process commands and/or information related to the charge or discharge schedule received from the PGCC 310 using a communication protocol agreed with the EVCC 150.

The communication between the EVCC 150 and the SECC 230 may be classified into a local communication connection and a remote communication connection.

Figure 2:
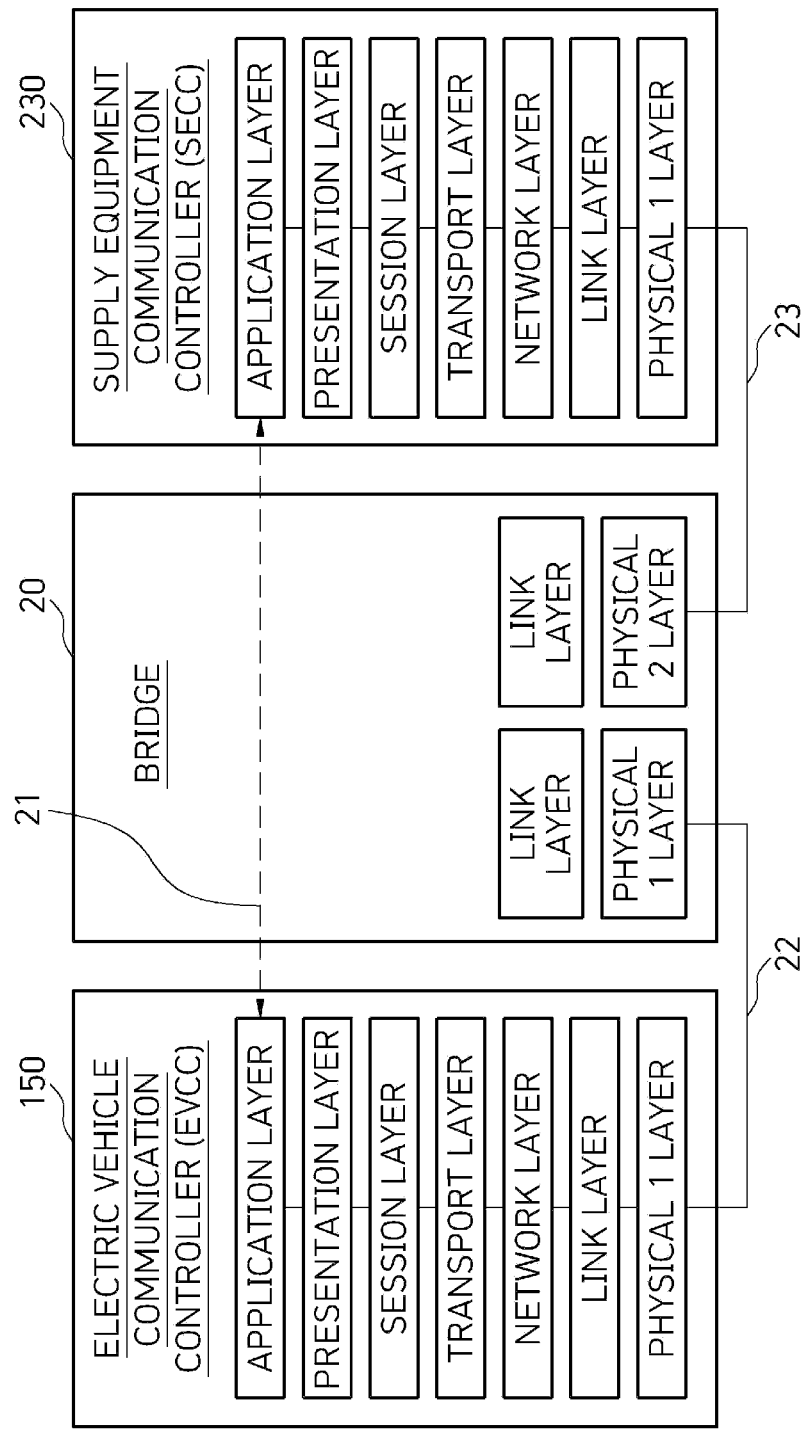
FIG. 2 is a diagram illustrating a local communication connection between an electric vehicle communication controller and a supply equipment communication controller using the open systems interconnection (OSI) layers according to an embodiment of the present invention.

FIG. 2 is a diagram illustrating a local communication connection between an electric vehicle communication controller and a supply equipment communication controller using the open systems interconnection (OSI) layers according to an embodiment of the present invention.

Referring to FIG. 2, when the EVCC 150 and the SECC 230 are locally connected, the EVCC 150 and the SECC 230 perform communication (21) in the same application layer through a bridge 20.

Physical 1 Layer of the EVCC 150 performs communication (22) with Physical 1 Layer of the bridge 20, and Physical 1 Layer of the bridge 20 and Physical 1 Layer of the SECC perform communication (23).

The bridge 20, a PLC chip for processing PLC, and the SECC 230 may be included in a circuit implemented in the same board (substrate).

Figure 3:
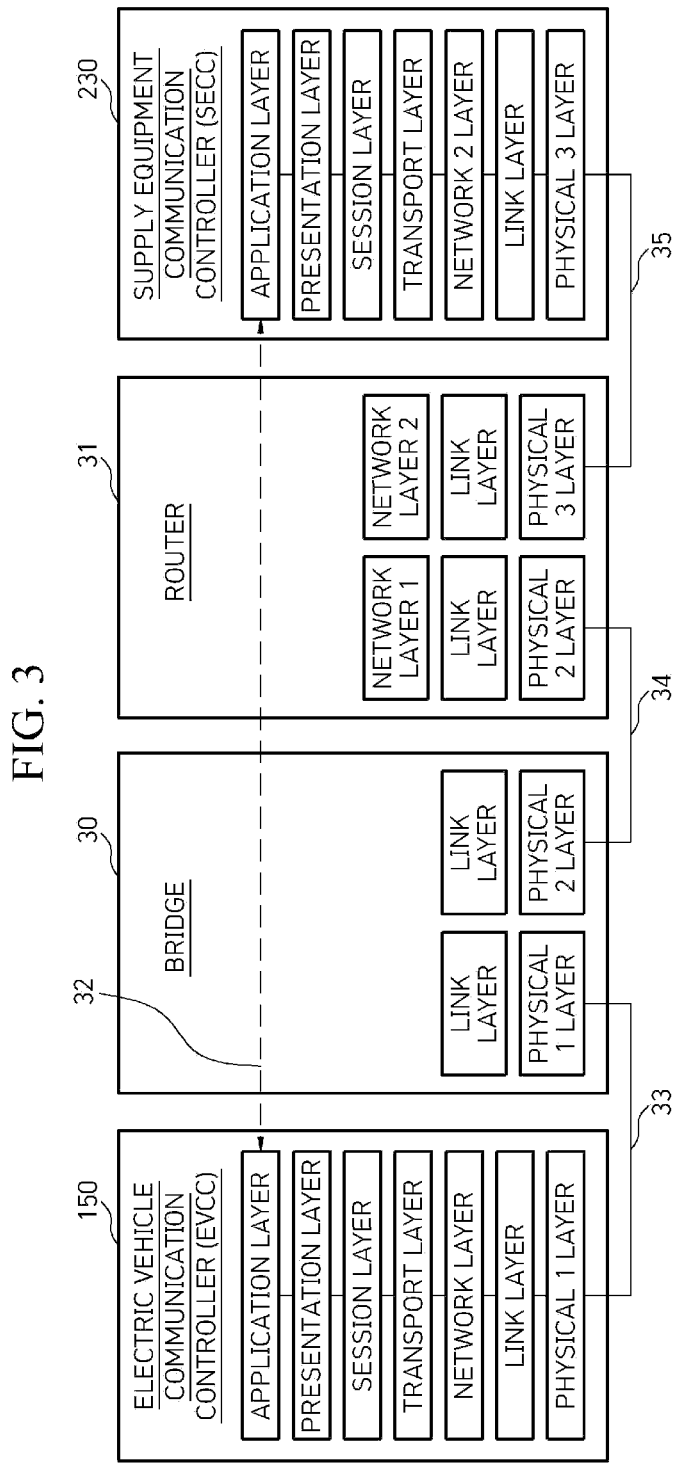
FIG. 3 is a diagram illustrating a remote communication connection between an electric vehicle communication controller and a supply equipment communication controller using the OSI layers according to another embodiment of the present invention.

FIG. 3 is a diagram illustrating a remote communication connection between an electric vehicle communication controller and a supply equipment communication controller using the OSI layers according to another embodiment of the present invention.

Referring to FIG. 3, for a remote communication connection between the EVCC 150 and SECC 230, a bridge 30 and a router 31 may be designed therebetween. In this case, the bridge 30 may be optional or have multiple bridges depending on the design architecture.

Through the bridge 30 and the router 31, the EVCC 150 and the SECC 230 performs communication (32) in the same application layer.

Physical 1 Layer of the EVCC 150 and physical 1 Layer of the bridge 30 perform communication (33), and Physical 2 Layer of the bridge 30 and Physical 2 Layer of the router 31 perform communication (34). Also, Physical 3 Layer of the router 31 and Physical 3 Layer of the SECC 230 perform mutual communication (35).

Figure 4:
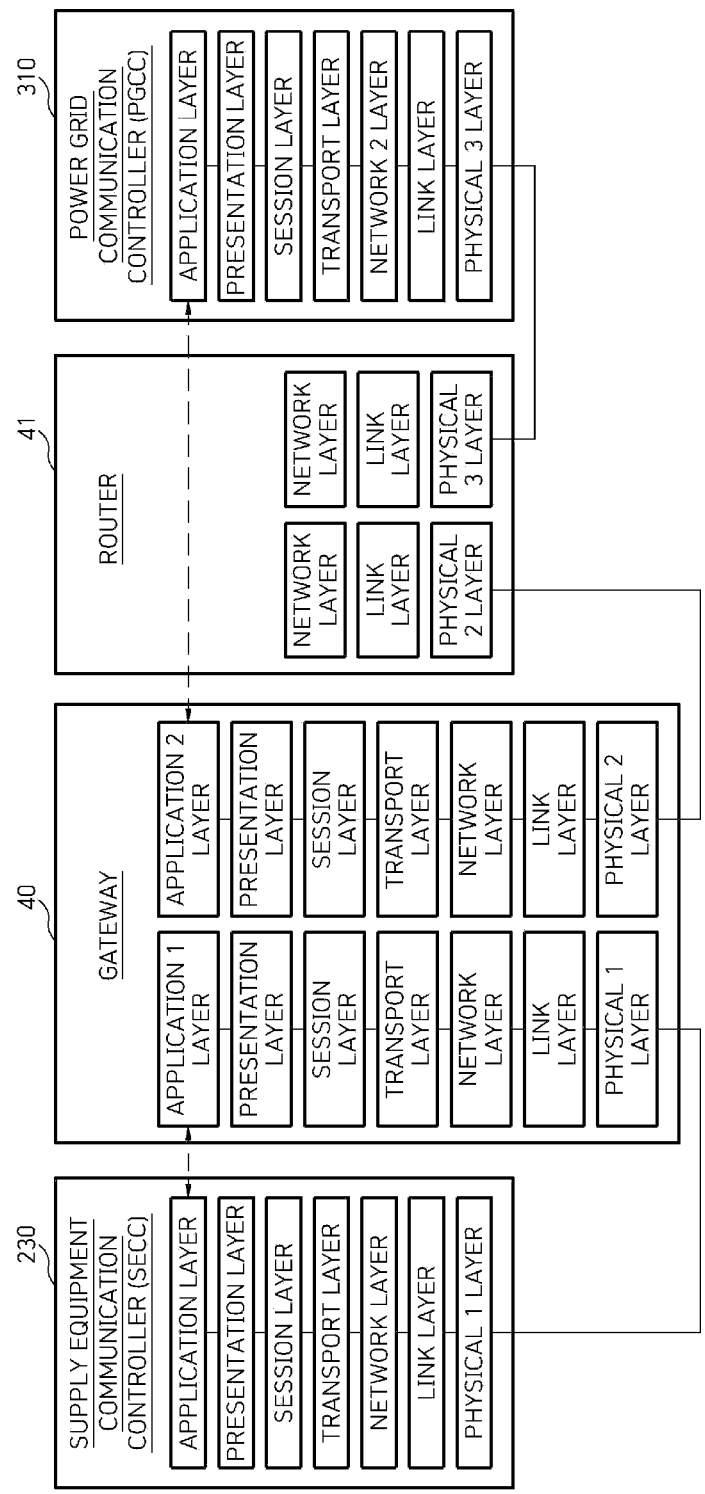
FIG. 4 is a diagram illustrating a communication connection between a supply equipment communication controller and a power grid communication controller using the OSI layers according to still another embodiment of the present invention.

FIG. 4 is a diagram illustrating a communication connection between a supply equipment communication controller and a power grid communication controller using the OSI layers according to still another embodiment of the present invention.

Referring to FIG. 4, for a communication connection between the SECC 230 and the PGCC 310, a gateway 40 and a router 41 may be designed therebetween. The designing of the router 41 may be optional.

The gateway 40, the router 41, a PLC chip, and the SECC 230 may be mounted on the same board and configured as one circuit.

The application layer of the SECC 230 performs communication with Application 1 Layer of the gateway 40, and Application 2 Layer of the gateway 40 performs communication with the application layer of the PGCC 310 through the router 41.

Physical 1 Layer of the SECC 230 performs communication with Physical 1 Layer of the gateway 40, and Physical 2 Layer of the gateway 40 may perform communication with Physical 2 Layer of the router 41. Also, Physical 3 Layer of the router 41 performs communication with Physical 3 Layer of the PGCC 310.

Figure 5:
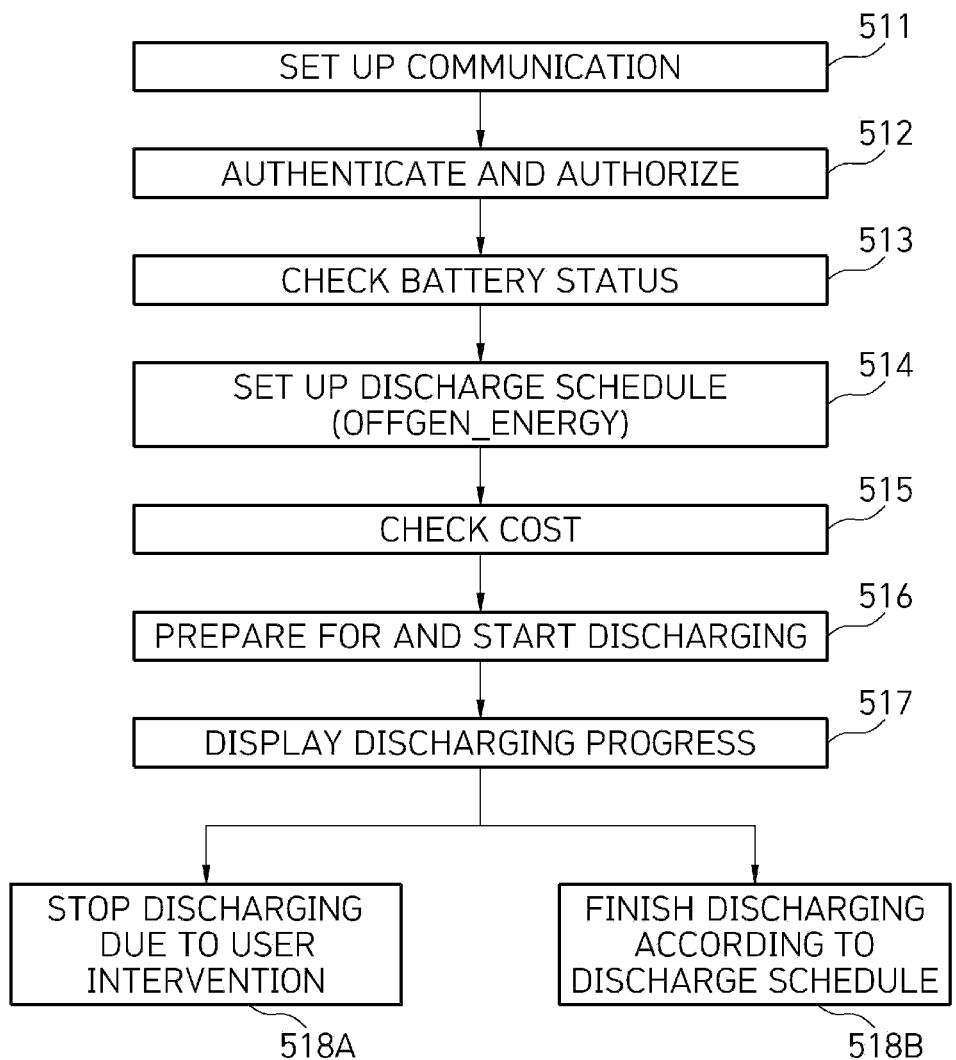
FIG. 5 is a flowchart illustrating a discharge scenario according to an embodiment of the present invention.

FIG. 5 is a flowchart illustrating a discharge scenario according to an embodiment of the present invention.

Referring to FIG. 5, first, in operation 511, communication setup is performed between the EVCC 150 and the SECC 230.

The communication setup may include procedures such as IP address assignment, SECC discovery, TCP or TLS connection setup, and V2G communication session setup.

The V2G communication session may be a session for exchanging a V2G message between the EVCC 150 and the SECC 230.

The V2G message may be a message exchanged in the application layer between the EVCC 150 and the SECC 230.

The communication setup may further include a process in which the EVCC 150 and the SECC 230 exchange information on a communication protocol version.

Subsequently, in operation 512, when the communication setup is completed, identification, authentication, and authorization processes are performed between the EVCC 150 and the SECC 230.

The EVSE 200 performs authentication processing to check whether the EV 100 is subject to charge or discharge. For example, the SECC 230 and the EVCC 150 exchange their IDs. The SECC 230 may deliver an ID (contract ID) of an EVCC associated with its own ID (EVSE ID) to the power grid operation server 300.

The authorization processing is started by the EVCC 150.

When the SECC 230 delivers the ID of the EVCC 150 associated with its own ID (EVSE ID) to the power grid operation server 300, the power grid operation server 300 may participate in the authentication and authorization processing for the EV 100. Here, the ID of the EVCC 150 may be unique identification code, a contact ID, a vehicle ID, or a vehicle user ID of the EVCC 150.

Subsequently, in operation 513, when the authentication and authorization processing is successfully completed, a process of checking the battery status of the EV 100 is performed.

The check of the battery status is a necessary procedure for setting up a discharge schedule. Information for the discharge schedule setup may include, for example, information related to the capacity of a battery (Bat_kWh), information related to the voltage of a battery (Bat_voltage), information related to the current SOC value of a battery (Bat_SOC), and the like.

Subsequently, in operation 514, after checking the battery status, a process of setting up a charge or discharge schedule is performed.

The charge schedule setup may be a target setting related to charging. The target setting related to the charging may be to set a time related to a charge process, the amount of energy charge, a charging method, etc. The charging method setting may be to select a quick charging method and/or the cheapest charging method.

The discharge schedule setup may be a target setting related to discharging. The target setting related to the discharging may be to set a time related to a discharge process, the amount of energy discharge, a discharging method, etc.

The discharging method setting may be to set a discharging method with the highest amount (or discharge cost) that the vehicle user or the operator (or electric provider) of the supply equipment can obtain in return when electric energy is delivered to the power grid 400.

Time setting related to the discharge process may be to reserve and set a discharge time. The discharge time includes a discharge start time and a discharge finish time. The setting of the amount of energy discharge may be to set a battery current, a battery voltage, the amount of battery power, etc.

Subsequently, in operation 515, when the discharge schedule setup is completed, a discharging-related cost check process is performed. The cost check process refers to a process of exchanging messages related to identification, authentication, and authorization performed between the EV, the EVSE, and the power grid operation server.

The discharging-related cost is a discharge cost that the vehicle user or the operator (electric provider) of the EVSE can obtain.

The discharge cost is a cost calculated based on a discharge time and the amount of energy discharge determined according to the discharge schedule. When the discharging is forcibly stopped by the intervention of the vehicle user or a third party, a cost calculated when the discharging is forcibly stopped is deducted from the discharge cost. The third party may be the operator (electric provider) of the EVSE or the operation of the power grid operation server. The cost calculated when the discharging is forcibly stopped is referred to as a return cost.

Subsequently, in operation 516, when the discharge cost check is successfully completed, the EV 100 informs the EVSE 200 that it is ready for discharging, or conversely, the EVSE 200 informs the EV 100 that it is ready for discharging.

When the EV 100 or the EVSE 200 receives a message related to the completion of the preparation for discharging (Gen_ready, Offgen_ready) from each other, the discharging is started.

Subsequently, in operation 517, when the discharging preparation process is successfully completed, discharging is started in which discharge energy is transferred from the OBC 120 of the EV 100 to the off-board charger 210 in the EVSE 200, and a process in which the HMI 320 of the power grid operation server 300 displays the discharging progress is performed.

Subsequently, a discharge stop process is performed by user intervention discharging is in progress in operation 518A, or a discharge finish process is performed by a discharge schedule in operation 518B.

The discharge stop process is a process of forcibly stopping a discharge process by the vehicle user, the operator of the EVSE 200, or the operator of the power grid operation server 300 while discharging is in progress.

The discharge stop may be initiated by executing a discharge stop-related button installed in the EVSE 200 and the power grid operation server 300.

Alternatively, the discharge stop may be initiated by the HMIs 140, 220, and 320 in the EVSE 200 and the power grid operation server 300.

The discharge finish is different from the discharge stop in which the discharging is forcibly stopped by external intervention in that the discharge finish is a process of normally finishing discharging at a discharge finish time reserved according to a discharge schedule.

FIG. 6 is a sequence diagram of messages exchanged between an electric vehicle, a supply equipment, and a power grid operation server on the basis of a discharge scenario according to an embodiment of the present invention and also is a sequence diagram in the case of setting up a discharge schedule in the electric vehicle.

When communication setup between the EVCC 150, the SECC 230, and the PGCC 310 is completed, the entities 120, 140, 150, 210, 230, and 300 exchange messages as shown in FIG. 6.

The term "message" shown in FIG. 6 may be replaced with any one term among "data," "signal," "information," "code," and "command." As shown in FIGS. 2 to 4, the messages may be messages exchanged in the application layer, but the present invention is not limited thereto. That is, the messages shown in FIG. 6 may be defined as messages exchanged in other layers.

Although the messages shown in FIG. 6 are arranged in a vertical direction, this arrangement need not be construed as an arrangement for indicating the transmission order of messages transmitted from one entity to another. Therefore, Message A may be transmitted after Message B is transmitted first although Message A appears above Message B in FIG. 6.

Although not particularly limited, each message shown in FIG. 6 may have a message structure composed of a header and a payload. Information for payload processing may be recorded in the header. For example, a protocol version, a payload type, and a payload length (or a message length) may be recorded in the header. Application data (e.g., each message shown in FIG. 6) may be recorded in the payload. Each message recorded in the payload may be expressed using multiple bit arrays or a flag value of "0" or "1."

Each message shown in FIG. 6 will be described in detail below.

The power grid operation server 300 transmits messages related to the sales tariff table to an EV 100.

The messages related to the sales tariff table include Grid_time_cost, Gen_time_cost_change, Grid_day_cost, Grid_night_cost, etc.

Grid_Time_Cost

The message Grid_time_cost may indicate or include information related to a discharge cost for each time according to a local grid situation or a grid schedule. The discharge cost is a cost paid to an electric vehicle (a vehicle user) in return for performing a discharge process in which the electric vehicle transfers energy to a power grid via an off-board charger.

The message Grid_time_cost is transmitted from the power grid operation server 300 to the EV 100 via the PGCC 310, the SECC 230, and the EVCC 150.

A gateway and/or a router may be additionally present between the SECC 230 and the PGCC 310 in a communication path of the message Grid_time_cost.

Hereinafter, unless otherwise specified, it is assumed that a gateway and/or a router are additionally present in a communication path between the SECC 230 and the PGCC 310.

The OBC 120 delivers the message Grid_time_cost received through the EVCC 150 to the HMI 140, and the HMI 140 displays and provides the message Grid_time_cost to the vehicle user.

The message Grid_time_cost is utilized to set up (or create) a discharge schedule. For example, the vehicle user may check the message Grid_time_cost to set up an optimal discharge time (a discharge reservation time). Here, the optimal discharge time is a time at which the highest discharge cost can be obtained from the vehicle user.

The discharge time includes a discharge start time (Gen_start_time) and a discharge finish time (Gen_finish_time) to be described below.

Grid_Time_Cost_Change

The message Gen_time_cost_change includes information related to a variation of a discharge cost for each time according to the local grid situation or grid schedule.

The message Grid_time_cost_change is transmitted from the power grid operation server 300 to the EV 100 via the PGCC 310, the SECC 230, and the EVCC 150. The message Gen_time_cost_change is utilized to set up (or create) a discharge schedule.

Grid_Day_Cost

The message Grid_day_cost may indicate or include information related to a discharge cost during day time everyday on the basis of the local grid situation or grid schedule.

The message Grid_day_cost is transmitted from the power grid operation server 300 to the EV 100 via the PGCC 310, the SECC 230, and the EVCC 150.

The message Grid_day_cost is utilized to set up (or create) a discharge schedule Gen_schedule.

Grid_Night_Cost

The message Grid_night_cost may indicate or include information related to a discharge cost during night time everyday on the basis of the local grid situation or grid schedule.

The message Grid_night_cost is transmitted from the power grid operation server 300 to the EV 100 via the PGCC 310, the SECC 230, and the EVCC 150.

The message Grid_nigh_tcost is utilized to set up (or create) a discharge schedule Gen_schedule.

The power grid operation server 300 may provide the messages Gen_time_cost, Gen_time_cost_change, Grid_day_cost, and Grid_night_cost to the electric vehicle 100 individually or may consolidate the messages Gen_time_cost, Gen_time_cost_change, Grid_day_cost, and Grid_night_cost into a sales tariff table and then provide the sales tariff table to the EV 100.

Grid_Energy_Limit

The message Grid_energy_limit may indicate or include a limit value when it is necessary for the power grid 400 to limit the amount of energy discharge according to the local grid situation.

The message Grid_energy_limit is transmitted from the power grid operation server 300 to the EV 100 via the PGCC 310, the SECC 230, and the EVCC 150.

Off_Gen_Day_Cost

The message Off_gen_day_cost may indicate or include information related to a discharge cost that is set differently for each off-board charger.

The message Off_gen_day_cost is transmitted from the off-board charger 210 to the EV 100 via SECC 230 and the EVCC 150.

FIG. 1 shows one off-board charger 210, but when multiple off-board chargers are present in the EVSE 200, each off-board charger has a different discharge cost from the other off-board chargers.

By each off-board charger delivering the message Off_gen_day_cost to the EV 100, the EV 100 may select an appropriate off-board charger and proceed with the discharge process.

The message Off_gen_day_cost is utilized to set up (or create) a discharge schedule Gen_schedule.

The OBC 120 provides the messages Gen_time_cost, Gen_time_cost_change, Grid_day_cost, Grid_night_cost, and Off_gen_day_cost received through the EVCC 150 to the vehicle user through the HMI 140.

After checking the messages Gen_time_cost, Gen_time_cost_change, Grid_day_cost, Grid_night_cost, and Off_gen_ day_cost displayed through the HMI 140, the vehicle user sets up an appropriate discharge schedule Gen_schedule. For example, the vehicle user sets an optimal discharge start time, an optimal discharge finish time, etc.

Bat_kWh, Bat_voltage, and Bat_SOC

The messages Bat_kWh, Bat_voltage, and Bat_SOC are delivered from the BMS 160 to the HMI 140, and the HMI 140 displays and provides the messages Bat_kWh, Bat_voltage, and Bat_SOC to the vehicle user to set up the discharge schedule. Also, the messages Bat_kWh, Bat_voltage, and Bat_SOC are delivered from the BMS 160 to the OBC 120.

The message Bat_kWh may indicate or include information related to the current battery capacity (current battery capacity information) of the vehicle battery 110.

The OBC 120 calculates a discharge time on the basis of the battery capacity information. The discharge time may include a discharge start time and a discharge finish time. Alternatively, the discharge time may be a time taken to reach the amount of energy discharge that is set by the vehicle user. The discharge time is utilized to set up (or create) a discharge schedule Gen_schedule.

The message Bat_voltage may indicate or include battery voltage information. The OBC 120 determines whether the battery voltage is abnormal using the battery voltage information, and then calculates the discharge time.

The OBC 120 determines whether the battery voltage is abnormal at high temperature in summer using the battery voltage information, and the determination result is utilized to calculate the discharge time (the discharge start time and the discharge finish time).

The OBC 120 determines whether the battery voltage is abnormal at low temperature in winter using the battery voltage information, and the determination result is utilized to calculate the discharge time (the discharge start time and the discharge finish time).

The message Bat_SOC may indicate or include information related to the current state of charge of the vehicle battery.

The OBC 120 utilizes the information related to the current state of charge to calculate the discharge time (the discharge start time and the discharge finish time).

The state of charge (SOC) is utilized as a criterion for determining whether the vehicle battery can be currently discharged. For example, the OBC 120 determines whether the current SOC value falls within a preset dischargeable SOC range.

When the current SOC value falls within the dischargeable SOC range that is set differently for each season, the discharge process is started. Otherwise, the discharge process is not started.

For example, the OBC 120 checks the current SOC value to determine the current SOC value falls within dischargeable SOC ranges that are set in spring and autumn. Also, the OBC 120 checks the current SOC value and determines whether the current SOC value falls within dischargeable SOC ranges that are set in summer and winter.

Gen_Energy

The message Gen_energy may indicate or include the amount of energy discharge that the OBC 120 intends to transfer to the off-board charger.

The vehicle user sets the amount of energy discharge through the HMI 140.

For example, the vehicle user sets the amount of energy discharge in comprehensive consideration of the sales tariff table provided from the power grid operation server 300, the message Off_gen_day_cost provided from the off-board charger, and the messages Bat_kWh, Bat_voltage, and Bat_SOC provided from the BMS.

Gen_Start_Time

The message Gen_start_time may indicate or include a discharge start time.

The message Gen_start_time is transmitted to the EVSE 200 or the off-board charger 210 via the EVCC and the SECC. Also, the message Gen_start_time is transmitted to the power grid operation server 300 via the EVCC, the SECC, and the PGCC.

The vehicle user sets a discharge start time through the HMI 140. In this case, similar to the setting of the amount of energy discharge, the vehicle user sets the discharge start time in comprehensive consideration of the sales tariff table provided from the power grid operation server 300, the message Offchar_day_cost provided from the off-board charger 210, and the messages Bat_kWh, Bat_voltage, and Bat_SOC provided from the BMS, which are displayed from the HMI 140.

For example, after checking the messages Gen_time_cost, Gen_time_cost_change, Grid_day_cost, Grid_night_cost, and Off_gen_day_cost through the HMI 140, the vehicle user sets and reserves an optimal discharge start time with the highest discharge cost to be received.

In an example, the vehicle user checks a discharge cost for each day time and for each night time through the HMI 140 and then sets and reserves a discharge start time. In another example, the vehicle user checks a discharge cost that varies daily or hourly and sets and reserves a discharge start time.
Gen_Finish_Time The message Gen_finish_time may indicate or include a discharge finish time.

The message Gen_finish_time is transmitted to the EVSE 200 or the off-board charger 210 via the EVCC and the SECC. Also, the message Gen_finish_time is transmitted to the power grid operation server 300 via the EVCC, the SECC, and the PGCC.

The vehicle user checks, through the HMI 140, the messages Grid_time_cost, Grid_time_cost_change, Grid_day_cost, Grid_night_cost, Off_gen_day_cost and the messages Bat_kWh, Bat_voltage, Bat_SOC received from the off-board charger 210 and/or the power grid operation server 300 and then sets and reserves, through the HMI 140, an optimal discharge finish time with the highest discharge cost to be received.
Gen_Schedule The message Gen_schedule may indicate or include discharge schedule-related information configured to include the messages Gen_energy, Gen_start_time, and Gen_finish_time.

The message Gen_schedule is transmitted to the EVSE 200 or the off-board charger 210 of the EVSE 200 via the EVCC 150 and the SECC 230.

Also, the message Gen_schedule is transmitted to the power grid operation server 300 via the EVCC 150, the SECC 230, and the PGCC 310.
Authorize_Code The message Authorize_code may indicate or include authorization code of a vehicle user. The message Authorize_code is delivered from the HMI 140 to the OBC 120.

The authorization code, which is special code assigned to each vehicle, is personal information used for cost settlement.
Authorize_Response The message Authorize_response is a message transmitted from the OBC 120 to the HMI 140 and is a response message to the message Authorize_code.
Data_Integrity_Check The message Data_integrity_check, which is a message transmitted from the HMI 140 to the OBC 120, is utilized to check identification code for a data integrity check.
Cost_Authorize_Request The message Cost_authorize_request, which is a message requesting authorization for a discharge cost, is transmitted from the EVSE 200 to the EV.

When receiving discharge schedule information Gen_schedule from the OBC 120 through the SECC 230, the off-board charger 210 calculates a discharge cost Cost_calc to be paid to the vehicle user on the basis of the received discharge schedule information Gen_schedule.

A discharge cost may be calculated based on a set cost per 1 KW. The set cost per 1 KW may be defined a sale tariff table provided by the power grid operation server 300. The set cost per 1 KW may be differently set based on time, day, night, and season. For example, the set cost per 1 KW may be set to be high at a time at which the amount of power consumption is high, and the set cost per 1 KW may be set to be low at a time at which the amount of power consumption is low.

When the set cost per 1 KW is 150 won, a discharge cost based on the amount of discharge (or the amount of energy discharge) of each vehicle may be listed in the following Table 1.

TABLE 1

| Division | Amount of discharge (kWh) | Discharge dost (won) |
|---|---|---|
| EV1 | 10 | 1,500 |
| EV2 | 15 | 2,250 |
| EV3 | 20 | 3,000 |
| Sum | | 6,750 |

Moreover, Table 1 may list a discharge cost individually calculated from the amount of discharge of each vehicle (individual discharge). In terms of shared economy, the amounts of discharge of vehicles discharged at the same time may be summated, and when a summated discharge amount is higher than or equal to a reference discharge amount (or a reference energy discharge amount), a discharge cost may be calculated by applying an additional calculation cost (summated discharge).

When the reference discharge amount is 40 kWh and the summated discharge amount is 40 kWh or more, it may be assumed that the additional calculation cost is 1%, and it may be assumed that the amounts of discharge of Table 1 is the amount of discharge is the amounts of discharge of three electric vehicles EV1, EV2, and EV3 discharged at the same time.

In Table 1, when the amounts of discharge of the three electric vehicles EV1, EV2, and EV3 are summated, a summated discharge amount may be 45 kWh (=10 kWh+10 kWh+15 kWh). Therefore, a discharge cost to which an additional calculation cost is applied by 1% may be about 6,818 (=6,750+67.5 (=6,750×1%)).

Comparing the amount of discharge of each vehicle with a sum 6,750 won of individually calculated discharge costs, a profit of about 68 won may be additionally obtained by applying an additional calculation cost to a discharge cost, and an additionally obtained profit may return to a user of each vehicle.

Therefore, each user may receive a more cost in a method, which calculates a discharge cost by summating the amount of discharge of an electric vehicle than the amounts of discharge of other electric vehicles, than a method of calculating a discharge cost on the basis of the amount of individual discharge.

The additional calculation cost may be differentially set based on a summated discharge amount, and for example, may be listed in the following Table 2.

TABLE 2

| Summated discharge amount (kWh) of amounts of discharge of electric vehicles participating in sum discharge | Additional calculation cost (%) |
| --- | --- |
| 40~79 | 1% |
| 80~119 | 1.5% |
| 120~159 | 2% |
| 160~199 | 2.5% |
| 200 or more | 3% |

Individual discharge to which the additional calculation cost is not applied and sum discharge to which the additional calculation cost is applied may be selected through the HMI 140 included in an electric vehicle.

When a user selects through the HMI 140 the sum discharge to which the additional calculation cost is applied, the EV 100 may transmit an authorization code Authorize_Code or a discharge schedule and a message, requesting the calculation of a discharge cost based on the sum discharge, to the EVSE 200.

The EVSE 200 may identify electric vehicles participating in the sum discharge, on the basis of the message, and in calculating a discharge cost of the identified electric vehicles, the addition calculation cost listed in Table 2 may be applied.

The off-board charger 210 may generate a cost authorization request message Cost_authorize_request including the calculated discharge cost and may transmit the cost authorization request message to the EV or the on-board charger of the EV 100 via the SECC 230 and the EVCC.

The off-board charger 210 configures the calculated discharge cost into the cost authorization request message Cost_authorize_request and transmits to the EV 100 or the OBC of the EV via the SECC 230 and the EVCC.

FIG. 6 shows that the off-board charger 210 calculates a discharge cost. However, the present invention is not limited thereto, and the power grid operation server 300 may also calculate a discharge cost. In this case, the power grid operation server 300 may calculate a discharge cost on the basis of the discharge schedule information Gen_schedule received through the SECC 230 of the EVSE 200 and may transmit the calculated discharge cost to the EV 100 through the EVSE 200.

When receiving a cost authorization request message Cost_authorize_request from the SECC 230, the EVCC 150 of the EV 100 delivers the cost authorization request message Cost_authorize_request to the OBC 120. The OBC 120 delivers discharge cost-related information Cost_calc included in the cost authorization request message Cost_authorize_request to the HMI 140, and the HMI 140 displays the discharge cost-related information Cost_calc to the vehicle user.

The vehicle user checks information on the discharge cost displayed from the HMI 140 and determines whether to authorize the discharge cost.

Cost_Authorize

The message Cost_authorize is a response to the message Cost_authorize_request and is a message indicating authorization for the discharge cost calculated by the off-board charger 210.

After receiving the authorization message Cost_authorize, the off-board charger 210 provides the authorization message Cost_authorize to an administrator (electric provider or operator) of the off-board charger 210 through the HMI 220.

When checking the authorization message Cost_authorize displayed from the HMI 220, the administrator of the off-board charger 210 starts preparing for discharging.

Gen_Ready

The message Gen_ready is a message indicating that it is ready for discharging and is a message that the OBC 120 and the off-board charger 210 exchange with each other.

When the exchange of the message Gen_ready is completed, the OBC 120 and the off-board charger 210 start the discharge process according to a set discharge schedule Gen_schedule.

Car_Energy_Stop

The message Car_energy_stop is a message for the vehicle user to forcibly stop charging the EV 100 while charging the EV 100, and is a message transmitted from the EV 100 to the EVSE 200 or to the power grid operation server 300 via the EVSE 200.

When the vehicle user inputs a command to forcibly stop the discharge process through the HMI 140, the HMI 140 delivers the message Car_energy_stop corresponding to the command to the OBC 120, and the OBC 120 transmits the message Car_energy_stop to the SECC 230 through EVCC 150.

The SECC 230 delivers the message Car_energy_stop received from the EVCC 150 to the off-board charger 210, and the off-board charger 210 stops the discharge process in response to the message Car_energy_stop.

Also, the SECC 230 transmits the message Car_energy_stop received from the EVCC 150 to the PGCC 310 of the power grid operation server 300 to inform the power grid operation server 300 that the charge process is stopped.

When receiving the message Car_energy_stop, the EVSE 200 and/or the power grid operation server 300 ignore the discharge finish time determined according to the discharge schedule and immediately stop the discharge process.

Meanwhile, when the vehicle user needs to immediately stop discharging the EV 100, the vehicle user may stop the discharge process using a discharge stop button displayed by the HMI 140 or a physical button installed in the EV 100.

Gen_Cost_Refund

The message Gen_cost_refund may indicate or include information related to a return cost added to the discharge cost received by the vehicle user from the EVSE 200 when the discharge process of the EV 100 is forcibly stopped by the message Car_energy_stop.

The return cost may be a cost corresponding to a difference between the amount of energy discharge Gen_energy determined according to the discharge schedule and the amount of energy discharged by the EV 100 when the discharging is forcibly stopped.

Similar to the calculation of the discharge cost, the calculation of the return cost may be performed by the off-board charger 210 or by the power grid operation server 300.

The calculation of the return cost may also be performed by an EV. In this case, an authorization procedure of the EVSE 200 or the power grid operation server 300 is required for the return cost calculated by the EV 100.

For this authorization, for example, the EV 100 may transmit a difference cost (return cost) calculated by the EV 100 to the SECC 230 through the EVCC 150 or to the PGCC 310 via the SECC 230.

The discharge stop of the vehicle battery may be initiated by the request of the EVSE 200 and/or the power grid operation server 300 rather than the EV 100.

For example, when an overload of the power grid 400 is expected (in summer), the power grid operation server 300 starts a discharge stop process by transmitting a discharge stop command to the EVSE 200 and the EV 100 and recovers a difference cost (or a return cost) caused by the discharge stop process.

The message Gen_cost_refund is delivered to the HMI 140 in the EV, and the HMI 140 displays the difference cost (return cost) returned to the EVSE 200 or the power grid operation server 300. Thus, the vehicle user may check the difference cost (return cost).

$CO_2$ Diminish_Sum

The message $CO_2$ diminish_sum indicates or includes information related to the amount of carbon dioxide ($CO_2$) reduction calculated based on the amount of energy consumption of the EV 100 or a value obtained by accumulating the amount of $CO_2$ reduction and is transmitted from the OBC 120 of the EV 100 to the power grid operation server 300 or the off-board charger 210 of the EVSE 200.

The OBC 120 periodically collects the amount of energy consumption of the EV 100 and calculates the amount of $CO_2$ reduction on the basis of the collected amount of energy consumption.

The amount of $CO_2$ reduction may be calculated by a conversion table or a conversion expression that represents a mapping relationship between the amount of energy consumption and the amount of $CO_2$ reduction. The conversion table or the conversion expression may be provided from the EVSE 200 or the power grid operation server 300.

The amount of energy consumption, which is the consumption amount of electric energy charged in the vehicle battery 110, may be calculated based on mileage and speed and may be provided from, for example, the BMS. It will be appreciated that the OBC 120 may calculate the amount of energy consumption on the basis of battery information provided from the BMS 160. The amount of energy consumption may be, for example, an SOC value, the amount of power consumption, etc.

Also, the amount of energy consumption may include at least one of the amount of energy charge and the amount of energy discharge.

The calculation of the amount of $CO_2$ reduction according to the amount of energy consumption may be performed by the BMS. In this case, the BMS provides the calculated amount of $CO_2$ reduction to the OBC 120.

The OBC 120 may deliver the amount of $CO_2$ reduction to the HMI 140, and the HMI 140 may display and provide the amount of $CO_2$ reduction to the vehicle user.

The amount of $CO_2$ reduction is utilized to provide credit or incentive to vehicle users who participate in $CO_2$ emission regulation.

For example, the amount of $CO_2$ reduction may be utilized to calculate an incentive cost added to a discharge cost paid to a vehicle user according to the amount of energy consumption of the EV 100 and/or a cost deducted from a charge cost that a vehicle user has to pay to the payment unit 240 of the EVSE 200 when charging an EV.

The calculation of the incentive cost or deduction cost may be performed by the OBC 210 or the power grid operation server 300. For example, the off-board charger 210 may calculate the incentive cost or the deduction cost on the basis of the amount of $CO_2$ reduction received through the SECC 230.

The calculated incentive cost or deduction cost may be provided to the EV 100 and may be displayed through the HMI 140 of the EV 100. The vehicle user checks the incentive cost or the deduction cost displayed through the HMI 140. In this case, when the calculation of the incentive cost or the deduction cost is incorrect, the EV 100 may re-request the off-board charger 210 or the power grid operation server 300 to calculate the cost.

FIG. 7 is a sequence diagram between an electric vehicle, a supply equipment, and a power grid operation server according to another embodiment of the present invention and also is a sequence diagram in the case of setting up a discharge schedule in the supply equipment.

When communication setup between entities 120, 140, 150, 210, 230, and 300 is completed, the entities 120, 140, 150, 210, 230, and 300 exchange messages as shown in FIG. 7.

The term "message" shown in FIG. 7 may be replaced with any one term among "data," "signal," "information," "code," and "command." Although not particularly limited, as shown in FIGS. 2 to 4, the messages may be messages exchanged in the application layer.

Although the messages shown in FIG. 7 are arranged in a vertical direction, this arrangement need not be construed as an arrangement for indicating the transmission order of messages. Therefore, depending on the design, Message A may be transmitted after Message B is transmitted first although Message A appears above Message B.

Similar to the message structure described with reference to FIG. 6, the message structure of FIG. 7 may be composed of a header and a payload. The description of the message structure shown in FIG. 7 is replaced with the description of the message structure described with reference to FIG. 6.

Each message shown in FIG. 7 will be described in detail below.

Authorize_Request

The message Authorize_request may indicate or include information related to an authentication authorization request. The information related to the authentication authorization request may be configured to include identification information ID of the off-board charger 210 or identification information EVSE ID of the EVSE 200.

An operator (electric provider) of the EVSE 200 inputs the information related to the authentication authorization request through the HMI 220 of the EVSE 200.

The off-board charger 210 delivers the information related to the authentication authorization request to the SECC 230, and the SECC 230 configures the information related to the authentication authorization request into the message Authorize_request according to a communication protocol agreed with the EVCC 150 and transmits the message Authorize_request to the EVCC 150.

The EVCC 150 delivers the message Authorize_request received from the SECC 230 to the OBC 120 of the EV 100, and the OBC 120 delivers the message Authorize_request to the HMI 140 in the EV 100.

The HMI 140 in the EV 100 displays the message Authorize_request delivered from the OBC 120 and provides the information related to the authentication authorization request made by the supply equipment to the vehicle user.

Authorize_Request_Tryout

The message Authorize_request_tryout is a message re-requesting authentication authorization from the EV 100.

Authorize_OK_Res

The message Authorize_OK_res is a response message to the message Authorize_request and is a message allowing the authentication authorization requested by the EVSE 200 or the off-board charger 210 of the EVSE 200.

The off-board charger 210 starts the discharge process when receiving the message Authorize_OK_res from the EV.

Authorize_NOK_Res

The message Authorize_NOK_res is a response message to the message Authorize_request and is a message disallowing the authentication authorization request of the off-board charger 210 in case of authentication failure.

When receiving the message Authorize_NOK_res from the EV 100, the EVSE 200 terminates the authorization process or transmits the message Authorize_request_tryout to the EV to re-request authentication authorization.

Bat_kWh, Bat_Voltage, Bat_SOC

The messages Bat_kWh, Bat_voltage, and Bat_SOC are the same as the messages Bat_kWh, Bat_voltage, and Bat_SOC described with reference to FIG. 6.

The messages Bat_kWh, Bat_voltage, and Bat_SOC are utilized for the setup of a discharge schedule performed in the EVSE 200 and are displayed through the HMI 220 of the EVSE 200.

The operator (electric provider) of the EVSE 200 sets up a discharge schedule on the basis of the messages Bat_kWh, Bat_voltage, Bat_SOC displayed from the HMI 220.

The discharge schedule setup of the EVSE 200 may also be performed by the vehicle user rather than the operator (or the electric provider) of the EVSE 200.

For example, after the vehicle user moves to the EVSE 200, the vehicle user may set up the discharge schedule by inputting information related to the discharge schedule to the HMI 220 of the EVSE 200.

Offgen_Energy

The message Offgen_energy, which is a message indicating or including the amount of energy discharge of the off-board charger 210, is transmitted from the EVSE 200 to the EV 100.

The vehicle user or the operator (electric provider) of the EVSE 200 sets the amount of energy discharge on the basis of the sales tariff table provided from the power grid operation server 300 and/or the messages Bat_kWh, Bat_voltage, and Bat_SOC provided from the EV 100, and inputs the amount of energy discharge to the HMI 220.

The sales tariff table includes the messages Grid_time_cost, Grid_time_cost_change, Grid_day_cost, and Grid_night_cost.

The HMI 220 delivers the input amount of energy discharge to the off-board charger 210, and the off-board charger 210 delivers the amount of energy discharge delivered from the HMI 220 to the SECC 230.

The SECC 230 configures the amount of energy discharge transferred from the HMI 220 into the message Offgen_energy on the basis of a communication protocol agreed with the EVCC 150 and transmits the message Off_gen_energy to the EVCC 150.

The amount of energy discharge, which is the amount of energy delivered by the off-board charger 210 to the power grid 400, is utilized as information for setting up the discharge schedule.

The operator of the EVSE 200 or the vehicle user of the EV 100 sets the most advantageous amount of energy discharge on the basis of the sales tariff table.

The setting of the amount of energy discharge may also be performed by the power grid operation server 300. In this case, the power grid operation server 300 may receive messages or information necessary to set the amount of energy discharge from the EVSE 200 or from the EV 100 via the EVSE 200.

Off_Gen_Start_Time

The message Off_gen_start_time indicates or includes a discharge start time of the off-board charger 210 and is transmitted from the EVSE 200 to the EV 100. The message Off_gen_start_time may be one of the pieces of information for setting the discharge schedule.

The operator of the EVSE 200 may reserve and set the discharge start time of the off-board charger 210 using the HMI 220. At this time, the operator of the EVSE 200 may reserve and set an optimal discharge start time on the basis of the sales tariff table provided from the power grid operation server 300 and the messages Bat_kWh, Bat_voltage, and Bat_SOC received through the SECC 230. Here, the optimal discharge start time may be a time at which the vehicle user or the operator of the EVSE 200 can receive the highest discharge cost.

The setting of the discharge start time may be performed not by the operator of the EVSE 200 but by the vehicle user. For example, after moving to the EVSE 200, the vehicle user may set the optimal discharge start time using the HMI 220 of the EVSE 200.

The setting of the discharge start time may also be performed by the power grid operation server 300. In this case, the power grid operation server 300 may receive messages or information necessary to set the discharge start time from the EVSE 200 or from the EV 100 via the EVSE 200.

Off_Gen_Finish_Time

The message Off_gen_finish_time indicates or includes a discharge finish time of the off-board charger 210 and is transmitted from the EVSE 200 to the EV 100. The discharge finish time may be one of the pieces of information constituting the discharge schedule.

The message Off_gen_finish_time may be one of the pieces of information for setting the discharge schedule.

The operator of the EVSE 200 may reserve and set the discharge finish time of the off-board charger 210 using the HMI 220. At this time, the operator of the EVSE 200 may reserve and set the discharge finish time on the basis of the sales tariff table provided from the power grid operation server 300 and the messages Bat_kWh, Bat_voltage, and Bat_SOC provided from the EV 100.

The setting of the discharge finish time may be performed not by the operator of the EVSE 200 but by the vehicle user. For example, after moving to the EVSE 200, the vehicle user may set the discharge start time using the HMI 220 of the EVSE 200.

The setting of the discharge finish time may also be performed by the power grid operation server 300. In this case, the power grid operation server 300 may receive messages or information necessary to set the discharge finish time from the EVSE 200 or from the EV 100 via the EVSE 200.

The off-board charger 210 configures a discharge schedule Offgen_schedule based on the messages Off_gen_energy, Off_gen_start_time, and Off_gen_finish_time input through the HMI 220.

The off-board charger 210 transmits the discharge schedule Off_gen_schedule to the EV 100 through the SECC 230. FIG. 7 illustrates an example in which the off-board charger 210 transmits the discharge schedule Off_gen_schedule to the EV 100, but the off-board charger 210 may transmit the discharge schedule Off_gen_schedule to the power grid operation server 300.

The HMI 140 of the EV 100 displays the discharge schedule Off_gen_schedule received from the EVSE 200 so that the vehicle user can check the discharge schedule Off_gen_schedule.

The HMI 320 of the power grid operation server 300 displays the discharge schedule Off_gen_schedule received from the EVSE 200 so that the operator of the power grid operation server 300 can check the discharge schedule Off_gen_schedule.

Cost_Calc

The message Cost_calc indicates or includes a discharge cost calculated based on the discharge schedule set by EVSE 200 and is transmitted from the off-board charger 210 to the power grid operation server 300 and/or the EV 100.

The discharge cost may be a cost paid to the operator of the EVSE 200 in return for the EVSE 200 transferring energy to the power grid operation server 300 or a cost paid to the vehicle user of the EV 100 in return for the EV 100 transferring energy to the power grid operation server 300 via the EVSE.

The cost paid to the vehicle user may be a portion of the cost paid to the operator of the EVSE 200. The calculation of the discharge cost may also be performed by the power grid operation server 300.

When the power grid operation server 300 calculates a discharge cost, the power grid operation server 300 transmits the calculated discharge cost to the EVSE 200 or to the EV via the EVSE 200.

Cost_Authorize_Request

The message Cost_authorize_request, which is a message requesting authorization for a calculated discharge cost, is transmitted from the EVSE 200 to the EV 100.

When the power grid operation server 300 calculates a discharge cost, the message Cost_authorize_request is transmitted to the EVSE 200 or to the EV 100 via the EVSE 200.

Cost_Authorize_OK_Res

The message Cost_Authorize_OK_res is a response message to the message Cost_authorize_request and is an authorization message for a discharge cost. The message Cost_Authorize_OK_res is transmitted from the EV 100 to the EVSE 200.

Cost_Authorize_NOK_Res

The message Cost_Authorize_NOK_res is a response message to the message Cost_authorize_request and is a message disallowing the authorization for the discharge cost. The message Cost_Authorize_OK_res is transmitted from the EV 100 to the EVSE 200.

Off_Gen_Ready

The message Off_gen_ready, which is a message informing the electric vehicle 100 that the EVSE 200 is ready for discharging, is transmitted from the EVSE 200 to the EV 100.

The OBC 120 of the EV 100 starts a discharge process and delivers the message Off_gen_ready to the HMI 140 of the EV 100 when the message Off_gen_ready is received from the EVSE 200 through the EVCC 150.

When the HMI 140 displays that the off-board charger 210 is ready for discharging, the vehicle user commands the OBC 120 to start discharging using the HMI 140.

The message Off_gen_ready may also be transmitted to the power grid operation server 300 to inform the power grid operation server 300 that the off-board charger 210 is ready for discharging.

Off_Gen_Energy_Stop

The message Off_gen_energy_stop, which is a message for forcibly stopping the discharge process according to the intervention of the vehicle user or the operator of the EVSE 200 while the discharging is in progress, is transmitted from the EVSE 200 to the EV 100 and/or the power grid operation server 300.

The forcible stop of the discharge process may be performed by the HMI 220 of the EVSE 200. The vehicle user may forcibly stop the discharge process using the HMI 220 of the EVSE 200.

The forcible stop of the discharge process may also be performed by the operator of the power grid operation server 300, and in this case, the power grid operation server 300 transmits the message Off_gen_energy_stop to the EVSE 200 and/or the EV 100.

Off_Gen_Cost_Refund

The message Off_gen_Cost_refund may indicate or include a return cost indicating the difference between a discharge cost calculated based on the discharge finish time (Off_gen_finish_time) set and reserved by the vehicle user of the EV or the operator of the EVSE and a discharge cost calculated based on a discharge finish time when the discharge process of the EV 100 is forcibly stopped by the operator of the EVSE 200.

The return cost is a cost obtained by deducting a discharge cost calculated until the discharge process is forcibly stopped (the discharge stop time) from a discharge cost initially calculated according to the forcible stop of the discharge process.

The message Off_gen_Cost_refund is transmitted to the EV 100 and the power grid operation server 300 and then displayed by the HMI 140 of the EV 100 and the HMI 320 of the power grid operation server 300.

Although not shown in FIG. 7, the EVSE 200 and the EV 100 may exchange messages related to the authorization procedure for the return cost. Similarly, the EVSE 200 and the power grid operation server 300 may exchange messages related to the authorization procedure for the return cost.

Off_Gen_$CO_2$ Diminish_Sum

The message Off_gen_$CO_2$ diminish_sum indicates or includes information related to the amount of $CO_2$ reduction calculated based on the amount of energy consumption (the amount of electricity consumption) of the off-board charger 210 or a value of accumulating the amount of $CO_2$ reduction and is transmitted from the EVSE 200 to the EV 100.

The off-board charger 210 periodically collects the amount of energy consumption of the EV 100 or the amount of energy consumption of the off-board charger 210 and calculates the amount of $CO_2$ reduction on the basis of the collected amount of energy consumption.

The amount of $CO_2$ reduction may be calculated by a conversion table or a conversion expression that represents a mapping relationship between the amount of energy consumption and the amount of $CO_2$ reduction. The conversion table or the conversion expression may be provided from the power grid operation server 300.

The conversion table or the conversion expression may be included in a sales tariff table provided by the power grid operation server 300.

The amount of energy consumption of the off-board charger 210 may include at least one of the amount of energy that the off-board charger 210 transfers to the OBC 120 of the EV 100 (the charging of the EV), the amount of energy that the off-board charger 210 receives from the OBC 120 of the EV 210 (the discharging of the EV), and the amount of energy that the off-board charger 210 transfers to the power grid.

Information related to the amount of $CO_2$ reduction is transmitted to the HMI 140 of the EV 100 and the HMI 320 of the power grid operation server 300, and the vehicle user and the operator or the power grid operation server 300 are informed of the information related to the amount of $CO_2$ reduction.

The amount of $CO_2$ reduction is utilized to calculate credit or an incentive cost for vehicle users or operators of the EVSE 200 who participate in $CO_2$ emission regulation.

For example, the amount of $CO_2$ reduction may be utilized to calculate an incentive cost added to a discharge cost paid to the vehicle user or the operator of the EVSE and/or a cost deducted from a charge cost that the vehicle user has to pay when the EV is charged.

Also, the amount of $CO_2$ reduction may be utilized to calculate an incentive cost added to a cost paid to the operator of the EVSE 200 on the basis of the amount of energy consumption of the off-board charger 210.

Off_Gen_Energy_Calculation

The message Off_gen_energy_calculation indicates or includes information related to the amount of energy consumption of the off-board charger 210 and is delivered to the power grid operation server 300.

The power grid operation server 300 checks the amount of energy consumption of the off-board charger 210 through the message Off_gen_energy_calculation, and the message Off_gen_energy_calculation is utilized to calculate a cost corresponding to the amount of energy consumption and a cost to be returned from the power grid to the EVSE 200 or the EV 100.

As described above, by defining a discharging-related message exchanged between an electric vehicle, a supply equipment, and a power grid, it is possible to establish an efficient billing policy for each time, and also it is possible to efficiently operate the power grid. Also, it is possible to provide credit or incentive to a vehicle user and an operator of a supply equipment that participate in $CO_2$ emission regulation.

As described above, a discharging-related message exchanged between an electric vehicle, a supply equipment, and a power grid may be defined, and thus, an efficient billing policy for each time may be established.

The scope of the present invention should be defined not by the detailed description but by the appended claims, and all differences falling within a scope equivalent to the claims should be construed as being encompassed by the present invention.

The battery charging apparatus 120, battery charging apparatus 1912, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of communicating between an electric vehicle, a supply equipment, and a power grid operation server that monitors a power grid. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque(STT)-MRAM, static random-access memory (SRAM), thyristor RAM (T-RAM), zero capacitor RAM (Z-RAM), twin transistor RAM (TTRAM), conductive bridging RAM(CBRAM), ferroelectric RAM (FeRAM), phase change RAM (PRAM), resistive RAM(RRAM), nanotube RRAM, polymer RAM (PoRAM), nano floating gate Memory(NFGM), holographic memory, molecular electronic memory device), insulator resistance change memory, dynamic random access memory (DRAM), static random access memory (SRAM), flash memory, non-volatile memory, CD–ROMs, CD–Rs, CD+Rs, CD–RWs, CD+RWs, DVD–ROMs, DVD–Rs, DVD+Rs, DVD–RWs, DVD+RWs, DVD–RAMs, BD–ROMs, BD–Rs, BD–R LTHs, BD–REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of communicating between an electric vehicle, a supply equipment, and a power grid operation server that monitors a power grid, the method comprising:
    transmitting, by an electric vehicle communication controller of the electric vehicle, a discharge schedule comprising an amount of energy discharge, a discharge start time, and a discharge finish time to a supply equipment communication controller of the supply equipment or a power grid communication controller of the power grid operation server;
    receiving a discharge cost calculated according to the discharge schedule from the supply equipment communication controller or the power grid communication controller; and
    initiating a discharge process of the electric vehicle to the supply equipment or the power grid according to the discharge schedule,
    wherein the discharge cost comprises an additional calculation cost, in response to a sum of the amount of energy discharge of the electric vehicle and an amount of energy discharge of another electric vehicle being greater than or equal to a reference energy discharge amount.

2. The method of claim 1, further comprising setting up the discharge schedule in the electric vehicle prior to the transmitting of the discharge schedule,
    wherein the setting up of the discharge schedule comprises setting a discharge start time and a discharge finish time on the basis of battery capacity information, battery voltage information, and state-of-charge information.

3. The method of claim 1, wherein the transmitting of the discharge schedule comprises transmitting a message for calculation of the discharge cost, to the supply equipment communication controller of the supply equipment or the power grid communication controller of the power grid operation server on the basis of the sum of the amount of energy discharge of the electric vehicle and the amount of energy discharge of the another electric vehicle.

4. The method of claim 1, wherein the additional calculation cost is varied based on the sum of the amount of energy discharge of the electric vehicle and the amount of energy discharge of the another electric vehicle.

5. The method of claim 1, further comprising:
    transmitting an authorization message for the discharge cost to the supply equipment communication controller or the power grid communication controller using the electric vehicle communication controller; and
    transmitting a message, indicating that the discharge process is forcibly stopped, in response to the discharge process being stopped prior to the discharge finish time by an user of the vehicle, to the supply equipment communication controller or the power grid communication controller using the electric vehicle communication controller.

6. The method of claim 5, further comprising:
    receiving, from the supply equipment communication controller or the power grid communication controller, a message indicating a return cost of a difference between a discharge cost calculated based on the discharge finish time and a discharge cost calculated when the discharge is forcibly stopped, in response to the discharge process being forcibly stopped.

7. A method of communicating between an electric vehicle, a supply equipment, and a power grid operation server that monitors a power grid, the method comprising:
- transmitting, by a supply equipment communication controller embedded in the supply equipment, a discharge cost based on a discharge schedule of the electric vehicle to an electric vehicle communication controller embedded in the electric vehicle;
- transmitting a message related to an authorization request for the discharge cost to the electric vehicle communication controller using the supply equipment communication controller;
- initiating a discharge process of the electric vehicle to the supply equipment or the power grid according to the discharge schedule according to the discharge schedule responsive to receiving, at the supply equipment communication controller, an authorization message for the discharge cost from the electric vehicle communication controller,
- wherein the discharge cost comprises an additional calculation cost, in response to a sum of the amount of energy discharge of the electric vehicle and an amount of energy discharge of another electric vehicle being greater than or equal to a reference energy discharge amount.

8. The method of claim 7, further comprising setting up the discharge schedule in the supply equipment prior to the transmitting of the discharge cost based on the discharge schedule,
- wherein the setting up of the discharge schedule is based on battery capacity information, battery voltage information, and state-of-charge information received from the electric vehicle communication controller and a sales tariff table received from a power grid communication controller of the power grid operation server.

9. The method of claim 7, further comprising setting up the discharge schedule in the supply equipment prior to the transmitting of the discharge cost,
- wherein the discharge schedule comprises the amount of energy discharge, a discharge start time, and a discharge finish time.

10. The method of claim 9, further comprising, after the receiving of the authorization message for the discharge cost, transmitting, to the supply equipment communication controller and a power grid communication controller of the power grid operation server, a message indicating that the discharge process is forcibly stopped by an operator of the supply equipment.

11. The method of claim 10, further comprising:
- transmitting, from the electric vehicle communication controller or the power grid communication controller, a message indicating a return cost of a difference between a discharge cost calculated based on the discharge finish time and a cost calculated based on a finish time when the discharge is forcibly stopped, in response to the discharge process being forcibly stopped.

12. The method of claim 7, further comprising:
- calculating an amount of carbon dioxide reduction on the basis of the amount of energy consumption of an off-board charger of the supply equipment using the supply equipment communication controller; and
- transmitting information related to the amount of carbon dioxide reduction to the electric vehicle communication controller and the power grid communication controller.

* * * * *